UNITED STATES PATENT OFFICE.

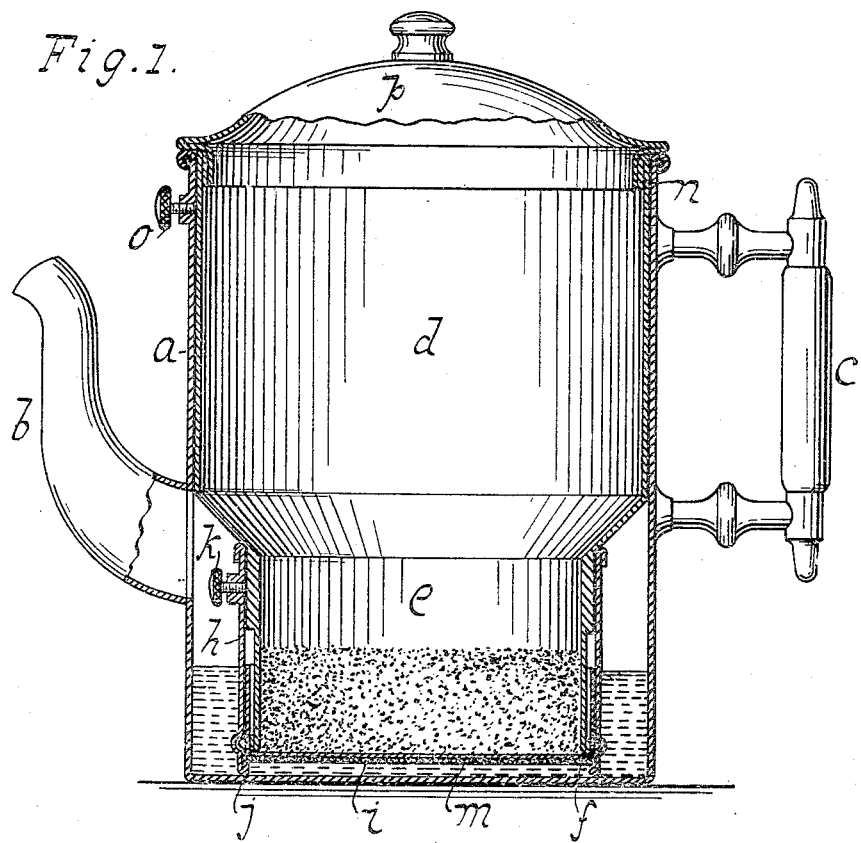
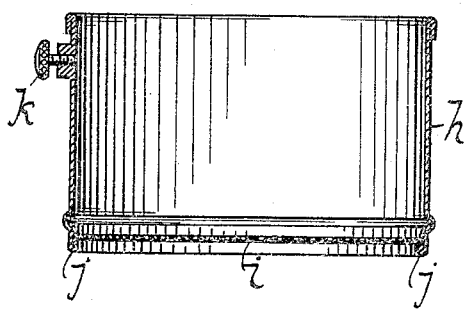
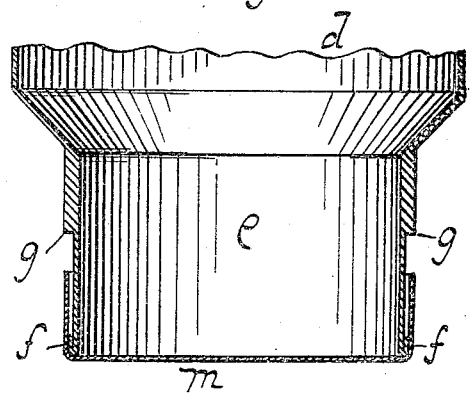

EUGENE F. GOODMAN, OF NEW YORK, N. Y.

COFFEE-PERCOLATOR.

1,124,011. Specification of Letters Patent. Patented Jan. 5, 1915.

Application filed November 6, 1913. Serial No. 799,422.

*To all whom it may concern:*

Be it known that I, EUGENE F. GOODMAN, a citizen of the United States, residing at New York, county of New York, State of New York, have invented new and useful Improvements in Coffee-Percolators, of which the following is a specification.

This invention relates essentially to a coffee pot in which the ground coffee is contained in a receptacle slidingly inserted into the pot. The body of the coffee receptacle is substantially the same diameter as the interior of the pot, and the lower portion of the receptacle which contains the ground coffee is of smaller diameter than the body. The lower end of the receptacle has fitted to it a cylindrical cup with a foraminous bottom, so that the liquid when poured into the receptacle on to the ground coffee will drip into the coffee pot. An auxiliary filter consisting of a piece of reticulated fabric may also be secured between the cup and the receptacle to give better filtration. The coffee receptacle when in its normal position rests on the bottom of the coffee pot and the height of the receptacle is practically the same as the coffee pot. The receptacle can be moved up or down within the limits of its body and held in position by means of a set screw.

The object of the foregoing construction is to raise the coffee receptacle out of the liquid and to gage the capacity of the pot. The peculiar design of the coffee holding receptacle whereby the upper portion fits closely in the body of the pot, comprehends means for adjusting the receptacle relative to the pot. Hence when the boiling liquid is poured into the receptacle it can almost be filled to the top. After the receptacle is adjusted to suit conditions the liquid is allowed to percolate into the pot without any attention. It will of course be understood that the water or coffee may be boiled, if desired, in a separate receptacle and then poured in the receptacle.

The novel features of the invention are more fully described in the following specification and claims and illustrated in the accompanying drawing in which:

Figure 1 represents a vertical section of a coffee pot embodying this invention. Fig. 2 is a detail section of a foraminous cup. Fig. 3 is a detail section of the lower portion of the coffee receptacle.

In this drawing the letter $a$ designates a coffee pot which is provided with a spout $b$ and a handle $c$. This pot is of ordinary construction and it has an open mouth as shown. Into this pot is inserted a ground coffee receptacle, consisting of a body portion $d$ of practically the same diameter as the interior of the pot. The receptacle normally rests on the bottom of the pot and the upper portion of the body is on a line with the top of the pot. The lower portion $e$ of the receptacle, is of smaller diameter than the upper portion and it has an overlapped lower end $f$, best seen in Fig. 3. The outer portion of the receptacle $e$ has a flanged rim $g$ which in conjunction with the overlapped lower portion forms a recess about the side of the receptacle the purpose of which will be hereinafter described. Over the lower portion of the receptacle is slipped a cup $h$ provided with a perforated bottom $i$ secured in place by beading the wall of the cup and overlapping the lower end $j$ of the cup. The cup $h$ fits over the lower portion $e$ of the receptacle and is fastened thereto by means of a set screw $k$ threaded into the side of the cup and jamming against the outer surface of the receptacle $e$. The cup can be removed from the receptacle for the purpose of cleaning it. The perforated sieve $i$ is of fine mesh but sometimes it is necessary to have finer filtration especially when the coffee is in small particles. This is accomplished by arranging a piece of fabric $m$ over the mouth of the receptacle $e$, as indicated in Fig. 3, before it is inserted in the cup $h$. The fabric is bent about the overlapped lower end $f$ of the receptacle and thus clamped between the receptacle and the cup. The free ends of the fabric are housed in the recess so as not to interfere with the clamping and tensioning of the fabric.

The body of the receptacle $d$ fits closely into the inner portion of the pot $a$ but when desired it can be slid up or down by gripping a rim $n$ located at the upper inner portion of the receptacle. The receptacle is held in a fixed position by means of a set screw $o$ threaded in the wall of the pot, and coacting with the outer body surface of the receptacle. A cover $p$ is supported on the top of the receptacle.

The ground coffee is placed into the lower contracted part of the receptacle and the receptacle is adjusted to the proper height from the bottom of the pot, the set screw $o$ is manipulated to engage the wall of the receptacle and thus hold the receptacle in the required position. The liquid is then poured into the receptacle and allowed to trickle through the interstices of the fabric and the perforated bottom into the pot. The body *d* of the receptacle includes more than one half of the depth of the pot, so that it can be slid outward within the limits of the body and held by the set screw. In this manner the space between the bottom of the pot and the receptacle can be varied to suit the amount of liquid poured into the coffee receptacle. It will be readily comprehended, that the set screw *o* in combination with the body *d* of the receptacle offers a medium of wide degree for adjusting the ground coffee container relative to the liquid holding pot.

I claim:

1. A coffee percolator comprising a cylindrical liquid containing pot, a cylindrical receptacle slidingly fitted into the pot, said receptacle having a lower contiguous member of smaller diameter the outer portion of which has an annular recess, a piece of fabric arranged to cover the bottom of the member the ends being bunched in the recess, a cylindrical perforated cup inserted over the fabric and secured to the member.

2. A coffee percolator comprising a cylindrical liquid containing pot, a cylindrical receptacle slidingly fitted into the pot, said receptacle having a lower contiguous member of smaller diameter the outer portion of which has an annular recess and a lapped lower edge, a piece of fabric arranged to cover the bottom of the member and bent upwardly over the lap to bunch in the recess, a cylindrical perforated cup inserted over the fabric and secured to the top of the member.

In testimony whereof I have hereunto set my hand in the presence of two subscribing witnesses.

EUGENE F. GOODMAN.

Witnesses:
H. ALMSTAEDT,
WILLIAM MILLER.

Copies of this patent may be obtained for five cents each, by addressing the "Commissioner of Patents, Washington, D. C."